UNITED STATES PATENT OFFICE 2,569,502

EPOXIDIZED OILS

Daniel Swern and Thomas W. Findley, Philadelphia, Pa., assignors to United States of America as represented by the Secretary of Agriculture No Drawing. Application February 7, 1945,
Serial No. 576,683

4 Claims. (Cl. 260—348)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to new compositions of matter and a process for preparing them, and more particularly, to the preparation of epoxidized oils, by which are meant triglycerides containing the epoxy group. The invention has among its objects the preparation of such epoxidized oils for use as chemical intermediates for organic synthesis, as plasticizers, and for use in the manufacture of plastics and rubber-like materials.

According to the invention, triglycerides, which contain at least one double bond and which may be both natural triglycerides, such as animal and vegetable fats and oils, or synthetic triglycerides, such as fatty acid esters of polyhydric alcohols, are reacted with an acetic acid solution of peracetic acid at a moderately low temperature and the resulting epoxidized oils separated. In the reaction, the ethylenic groups (double bonds) of the triglyceride are converted to epoxy groups without otherwise altering the molecular structure of the triglyceride.

The following examples are illustrative of the invention.

Example I

*Epoxidized lard oil.*—Ten grams of lard oil, having an iodine number of 63.8, was mixed with 29 cc. of a 1.04 M acetic acid solution of peracetic acid, and this reaction mixture was maintained at 20° C. for about four hours, with occasional stirring. The solution was then poured into cold water, and the epoxidized oil which separated out, was then further separated from the aqueous solution and dissolved in ether. The ether solution was then washed free from entrained acid and dried.

Evaporation of the ether yielded 9.6 grams of a viscous, yellow oil having an iodine number of 11.5 and an epoxy oxygen content of 2.87 percent, thus accounting for about 91 percent of the double bonds oxidized.

Example II

*Epoxidized neat's-foot oil.*—Using the procedure described in Example I, 10 grams of neat's-foot oil, having an iodine number of 75.5, was epoxidized with 34.3 cc. of a 1.04 M acetic acid solution of peracetic acid for about four hours.

Evaporation of the ether yielded 9.7 grams of an almost colorless oil having an iodine number of 11.8 and an epoxy oxygen content of 3.51 percent, thus accounting for about 91 percent of the double bonds oxidized.

Example III

*Epoxidized castor oil.*—Using the procedure as described in Example I, 10 grams of castor oil, having an iodine number of 84.3, was epoxidized with 32 cc. of a 1.14 M acetic acid solution of peracetic acid for about three hours.

Evaporation of the ether yielded 9.4 grams of an almost colorless, viscous oil, having an iodine number of 8.4 and an epoxy oxygen content of 3.70 percent, thus accounting for about 81 percent of the double bonds oxidized.

Example IV

*Epoxidized olive oil.*—Using the procedure as described in Example I, 10 grams of olive oil, having an iodine number of 85.2, was epoxidized with 38.8 cc. of a 1.04 M acetic acid solution of peracetic acid for about four hours.

Evaporation of the ether yielded 9.7 grams of a white semi-solid, having an iodine number of 10.5 and an epoxy oxygen content of 4.14 percent, thus accounting for about 92 percent of the double bonds oxidized.

Example V

*Epoxidized peanut oil.*—Using the procedure as described in Example I, 10 grams of peanut oil, having an iodine number of 99.8, was epoxidized with 45.3 cc. of a 1.04 M acetic acid solution of peracetic acid for about four hours.

Evaporation of the ether yielded 9.8 grams of an almost colorless oil having an iodine number of 13.8 and an epoxy oxygen content of 4.46 percent, thus accounting for about 88 percent of the double bonds oxidized.

Example VI

*Epoxidized rapeseed oil.*—Using the procedure as described in Example I, 10 grams of rapeseed oil, having an iodine number of 101.6, was epoxidized with 42.6 cc. of a 1.04 M acetic acid solution of peracetic acid for about four hours.

Evaporation of the ether yielded 9.7 grams of almost colorless oil, having an iodine number of 13.8 and an epoxy oxygen content of 4.30 percent, thus accounting for about 82 percent of the double bonds oxidized.

Example VII

*Epoxidized cottonseed oil.*—Using the procedure as described in Example I, 10 grams of cottonseed oil, having an iodine number of 114.5, was epoxidized with 52 cc. of a 1.04 M acetic acid solution of peracetic acid for about four hours.

Evaporation of the ether yielded 9.8 grams of pale-yellow oil having an iodine number of 18.4 and an epoxy oxygen content of 4.78 percent, thus accounting for about 84 percent of the double bonds oxidized.

Example VIII

*Epoxidized corn oil.*—Using the procedure as described in Example I, 10 grams of corn oil, having an iodine number of 125.4, was epoxidized with 57 cc. of a 1.04 M acetic acid solution of peracetic acid for about four hours.

Evaporation of the ether yielded 8.2 grams of an almost colorless oil having an iodine number of 18.9 and an epoxy oxygen content of 5.20 percent, thus accounting for about 82 percent of the double bonds oxidized.

Example IX

*Epoxidized soybean oil.*—Using the procedure as described in Example I, 10 grams of soybean oil, having an iodine number of 129.4, was epoxidized with 59 cc. of a 1.04 M acetic acid solution of peracetic acid for about four hours.

Evaporation of the ether yielded 10 grams of a colorless oil having an iodine number of 14.3 and an epoxy oxygen content of 5.05 percent, thus accounting for about 74 percent of the double bonds oxidized.

Example X

*Epoxidized linseed oil.*—Using the procedure as described in Example I, 10 grams of linseed oil, having an iodine number of 182.5, was epoxidized with 83 cc. of a 1.04 M acetic acid solution of peracetic acid for about four hours.

Evaporation of the ether yielded 10.4 grams of a pale-yellow oil having an iodine number of 26.0 and an epoxy oxygen content of 6.92 percent, thus accounting for about 77 percent of the double bonds oxidized.

Example XI

*Epoxidized perilla oil.*—Using the procedure as described in Example I, 10 grams of perilla oil, having an iodine number of 207.1, was epoxidized with 94 cc. of a 1.04 M acetic acid solution of peracetic acid for about four hours.

Evaporation of the ether yielded 10.8 grams of an almost colorless oil having an iodine number of 23.4 and an epoxy oxygen content of 7.46 percent, thus accounting for about 73 percent of the double bonds oxidized.

Example XII

*Epoxidized menhaden oil.*—Using the procedure as described in Example I, 10 grams of menhaden oil, having an iodine number of 180.4, was epoxidized with 112 cc. of a 0.90 M acetic acid solution of peracetic acid for about five and one-half hours.

Evaporation of the ether yielded 9.3 grams of an almost colorless oil having an iodine number of 16.1 and an epoxy oxygen content of 5.91 percent, thus accounting for about 63 percent of the double bonds oxidized.

Example XIII

*Epoxidized glyceryl trioleate.*—Using the procedure as described in Example I, 10 grams of glyceryl trioleate, having an iodine number of 83.7, was epoxidized with 32 cc. of a 1.14 M acetic acid solution of peracetic acid for about three hours.

Evaporation of the ether yielded 10.4 grams of a white semi-solid having an iodine number of 6.8 and an epoxy oxygen content of 4.41 percent, thus accounting for about 96 percent of the double bonds oxidized.

In the preceding examples, an excess of peracetic acid over that theoretically required to oxidize all the double bonds was employed. By the use of smaller quantities of oxidizing agent, any desired percent of the double bonds may be converted to epoxy groups, up to the maximum practically possible, as shown in Examples XIV and XV, following.

Example XIV

*Partially epoxidized linseed oil.*—Using the procedure as described in Example I, 100 grams of linseed oil, having an iodine number of 182.5, was epoxidized with 125 cc. of a 0.98 M acetic acid solution of peracetic acid for about one hour.

Evaporation of the ether yielded 95 grams of a yellow oil having an iodine number of 150.5 and an epoxy oxygen content of 1.60 percent, thus accounting for about 80 percent of the double bonds oxidized.

Example XV

*Partially epoxidized perilla oil.*—Using the procedure as described in Example I, 100 grams of perilla oil, having an iodine number of 207.1, was epoxidized with 135 cc. of a 0.90 M acetic acid solution of peracetic acid for about one hour.

Evaporation of the ether yielded 98 grams of a yellow oil having an iodine number of 171 and an epoxy oxygen content of 1.74 percent, thus accounting for about 76 percent of the double bonds oxidized.

Example XVI

*Epoxidized tobaccoseed oil.*—Using the procedure as described in Example I, 10 grams of tobaccoseed oil, having an iodine number of 142.6, was epoxidized with 115 cc. of a 0.753 M acetic acid solution of peracetic acid for about four and one-half hours.

Evaporation of the ether yielded 6.0 grams of pale-yellow oil having an iodine number of 4 and an epoxy oxygen content of 6.02 percent, thus accounting for about 77 percent of the double bonds oxidized.

Partially epoxidized drying oils prepared from high iodine number oils, such as perilla oil, have valuable drying properties due, perhaps, to the highly reactive epoxy group. In addition, epoxidized oils are lighter in color than the natural, untreated oils.

Reference is made to copending application, Serial No. 575,316, filed January 30, 1945, which is related to the present application.

Having thus described our invention, what is claimed is:
1. An epoxidized triglyceride.
2. Epoxidized glyceryl trioleate.
3. Epoxidized soybean oil.
4. Epoxidized linseed oil.

DANIEL SWERN.
THOMAS W. FINDLEY.

REFERENCES CITED

The following references are of record in the file of this patent:

UNITED STATES PATENTS

| Number | Name | Date |
| --- | --- | --- |
| 1,483,546 | Gelissen | Feb. 12, 1924 |
| 1,899,340 | Knorr et al. | Feb. 28, 1933 |
| 2,033,538 | Ralston et al. | Mar. 10, 1936 |
| 2,200,858 | Clayton et al. | May 14, 1940 |
| 2,386,250 | Mc Nally et al. | Oct. 9, 1945 |

OTHER REFERENCES

Smit—Recueil Des Travaux Chimiques des Pays, Bas, Tome 49 (1930), pages 678, 684 and 685.